United States Patent Office 3,368,146
Patented Feb. 6, 1968

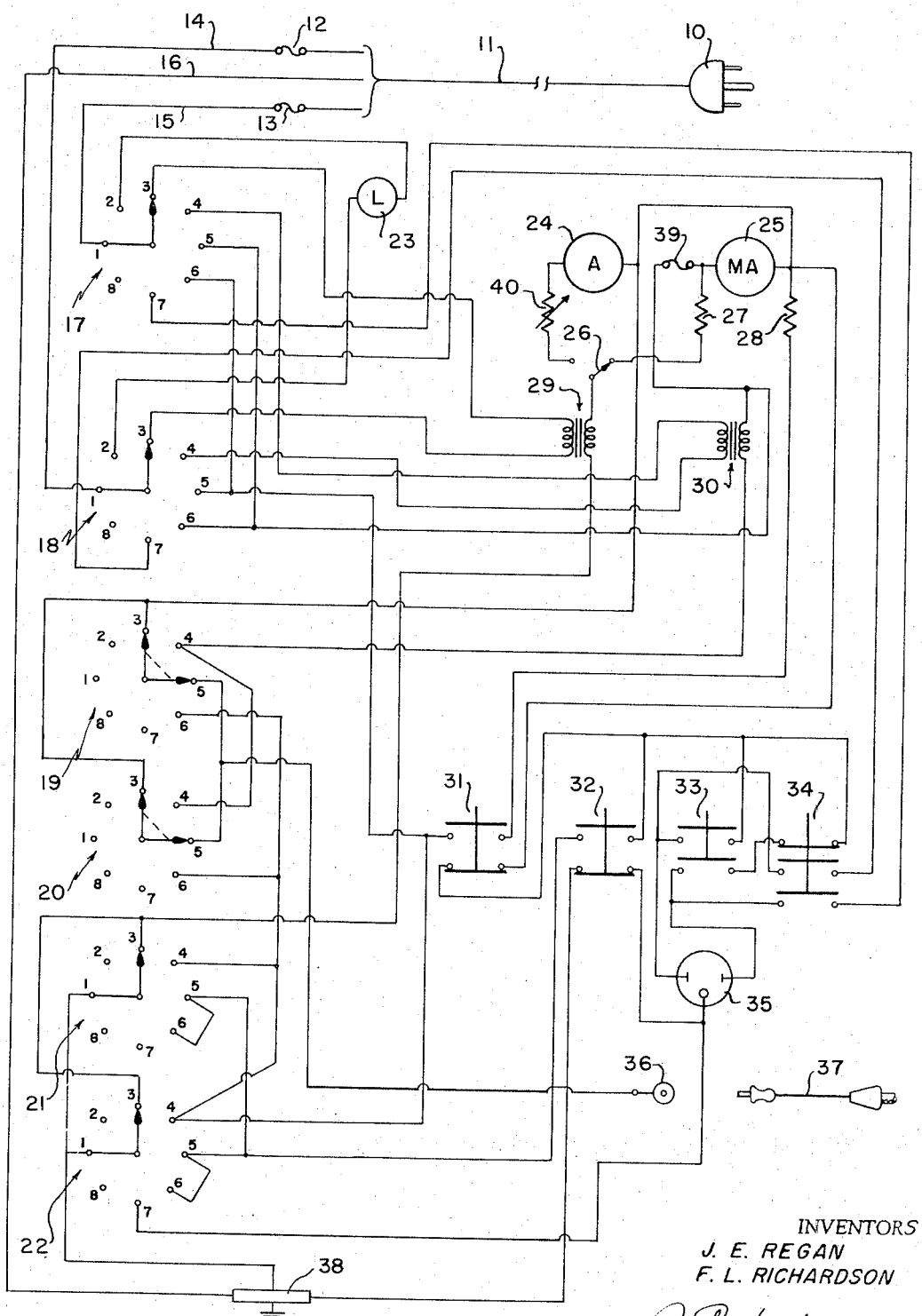
Feb. 6, 1968   J. E. REGAN ET AL   3,368,146
ELECTRICAL SAFETY TESTER HAVING A PLURALITY
OF SWITCHES FOR SETTING-UP TESTS
Filed May 25, 1966
INVENTORS
J. E. REGAN
F. L. RICHARDSON
BY  *O. E. Hodges*
ATTORNEY

3,368,146
ELECTRICAL SAFETY TESTER HAVING A PLURALITY OF SWITCHES FOR SETTING UP TESTS
John E. Regan, 10318 Aster Lane, Prince Georges County, Md. 20788, and Franklin L. Richardson, 5887 Four Mile Run Drive N., Arlington County, Va. 22205
Filed May 25, 1966, Ser. No. 552,989
1 Claim. (Cl. 324—51)

ABSTRACT OF THE DISCLOSURE

An electrical safety tester having a plurality of switches for setting up tests on electrical power outlets, cords and tools. Power applied to the tester is applied to an indicating lamp to test the power outlet, and, by metering, through a low voltage transformer to test the current carrying capacity of power cords and tools as well as ground circuit continuity and through a high voltage transformer to test the insulation resistance of tools. Power lines containing an isolation transformer are checked for continuity and leakage resistance by means of a meter.

---

The invention described herein may be manufactured and used by or for the Government of the United States of America for governmental purposes without the payment of any royalties thereon or therefor.

This invention relates to electrical testing equipment and more particularly to a portable safety tester for testing electrical equipment and power receptacles of the 3-wire grounded type.

The widespread use of electrically powered equipment in industry and the home has made it imperative that a simple device that can perform safety tests be devised. A particularly serious problem is the increasing use of portable equipment such as hand tools having metal casings. Under certain circumstances such tools can be extremely hazardous to the operator. For instance, if an insulation breakdown should occur between the metal casing and the power line, current may flow to ground through the operator causing injury or death.

In order to minimize the chances of such a hazard occurring, the 3-wire grounded power cable has been introduced. In this grounding arrangement, a cable is secured to the metal casing and the power line ground. If an insulation breakdown should occur in this type of equipment, current will flow through the grounded cable rather than through the operator (since the latter usually offers a high resistance path). However, although the shock hazard is minimized, it is not entirely eliminated since if the ground cable is open circuited or cannot handle the short circuit current arising from an insulation breakdown, the operator will be subjected once again to potential injury or death. Consequently, the value of safety testing of such equipment cannot be over emphasized, particularly on a continuing basis.

Accordingly, it is an object of this invention to provide an electrical safety tester which will reveal actual or potential safety hazards in electrical equipment.

Another object of this invention is to provide an electrical safety tester which is portable, easy to use and accurate.

Briefly stated the invention contemplates a safety tester adapted for testing 3-wire grounded receptacles and tools. The safety tester includes a variety of switches for establishing various test circuits within the tester whereby various tests can be performed on a piece of equipment undergoing testing without the need for changing test leads or otherwise disturbing the test set up. The tester is provided with an indicator lamp which will light if a 3-wire receptacle undergoing testing is correctly wired. The power line ground circuit of the 3-wire receptacle can be tested for current-carrying capacity and continuity with meters incorporated in the tester. A tool can be tested for insulation resistance by applying a high voltage provided by the tester across the tool and noting if any leakage current appears on the meters. The tool can also be tested for ground circuit capacity and continuity.

Referring now to the drawing wherein there is shown a schematic diagram of one specific embodiment of the tester, a three-wire cable 11 is connected by means of a three-pronged plug 10 to a mating receptacle (not shown). Cable 11 consists of a grounded lead 16 and two power leads 14 and 15, respectively. Conductor 14 is provided with a fuse 12 and conductor 15 is provided with a fuse 13.

The various tests to be performed are selected by means of a rotary contact switch which comprises several sections here denoted as 17, 18, 19, 20, 21 and 22. For convenience of operation, these sections may be ganged and, in this one specific embodiment of the invention, are ganged although for purposes of clarity they are not so shown in the drawing. Each of the switch sections contain a plurality of contacts numbered 1 thru 8. Switch sections 17, 18, 21 and 22 are each provided with one contact arm, while switch sections 19 and 20 are each provided with two contact arms fixedly spaced 90 degrees apart as shown in the drawing.

Ground lead 16 is attached to a ground terminal 38 within the tester housing, which may be of any suitable type. The power lead 14 is connected to contact 1 of switch section 18. Power lead 15 is connected to contact 1 of switch section 17. An indicator lamp 23 has one side connected to contact 2 of switch section 17 and its other side connected to contact 2 of switch section 18. Step-down transformer 29 has its primary connected to contact 3 of switch section 17 and contact 3 of switch section 18. The secondary of transformer 29 is connected to meter switch 26 on one side while its other side is connected to contact 3 of switch sections 21 and 22.

Meter switch 26 selects the appropriate meter for conducting the various tests. In the left or ammeter position, ammeter 24 is connected through variable resistor 40. In the right or milliammeter position, milliammeter 25 is connected through resistor 27.

As an example of the values of the components which may be used in the tester, variable resistor 40 may be 1 ohm, resistor 27 may be 500 ohms and resistor 28 may be 12K ohms. Ammeter 24 may have a full scale value of 50 amps while milliammeter may have a full scale value of 50 ma. Transformers 29 and 30 have 115 volt primaries and 5 volt and 500 volt secondaries, respectively.

The primary winding of high-voltage transformer 30 is connected on one side to contact 4 of switch section 17 and on its other side to contact 4 of switch section 18. The secondary of transformer 30 is connected through a fuse 39 to one terminal of milliammeter 25. The other side of the secondary winding of transformer 30 is connected to contact 4 of both switch sections 19 and 20. Contact 5 of both switch sections 17 and 18 are connected in common. In addition, contact 6 of switch section 17 is connected to contact 5 of switch section 18. Contact 6 of switch section 18 is connected to the junction of fuse 39 and the secondary of transformer 30. A connection is made between ammeter 24, milliammeter 25 and contact 3 of both switch sections 19 and 20. A common connection is made between contacts 6, 6, 4 and 4 of switch sections 19, 20, 21, and 22, respectively. In addition contact 5 of switch sections 19 and 20 are joined and contact 5 of switch sections 21 and 22 are joined. Contacts 5 and 6 of switch sections 21 and 22, respectively, are also joined. Contact 1 of switch sections 21 and 22 are connected to ground terminal 38. An input jack 36 for connection to the test cable 37 is connected to contact 5 of switch section 19.

A plurality of push button switches are provided for performing the various tests accomplished by the invention. Push button switch 31 has an upper pole and a lower pole. The upper pole, which is normally open is connected on one side to contact 5 of switch section 18 and on the other side to milliammeter 25 via resistor 28. The lower pole of push button switch 31, which is normally closed, is connected on one side to milliammeter 25 and on the other side to the upper pole of push button switch 32 as well as the upper poles of button switches 33 and 34.

The upper pole of push button switch 32, which is normally open, is connected between contact 5 of switch section 22 and the lower pole of push button switch 31. The lower pole of push button switch 32 is connected between ground point 38 and the ground connection of receptacle 35. The ground connection of receptacle 35 is connected to contact 7 of switch section 22.

Push button switch 33 has an upper pole which is normally open and which is connected between the upper pole of push button switch 32 and one power connection of receptacle 35. The lower pole of push button switch 33 is connected between the other power connection of receptacle 35 and the upper pole of push button switch 34. Push button switch 34 has three poles, an upper pole, lower pole and middle pole. The upper pole is normally closed while the middle and lower poles are normally open. The midde pole of push button switch 34 is connected to the upper pole of push button switch 33 and contact 7 of switch section 18. The lower pole of push button switch 34 is connected between the lower pole of push button switch 33 and contact 7 of switch section 17.

To operate the tester, power plug 10 is connected to the AC mains by being inserted into a suitable three-wire grounded receptacle (not shown). With the rotary control switch 17–22 in position No. 1, the tester is turned off. The three-wire grounded receptacle into which plug 10 is inserted may be tested by turning the control switch 17–22 to position No. 2. This will connect indicating lamp 23 across the power line. If the receptacle is properly wired, indicator light 23 will light-up. A three-wire extension cord may be tested after testing the power receptacle by inserting it between the tester power plug 10 and the power receptacle. Again if the lamp 23 lights up the extension cord is properly wired.

The receptacle is tested further by inserting the plug of test cord 37 into jack 36. The clip of test cord 37 is connected to a known ground. Control switch 17–22 is then turned to position No. 3. In this position, the primary of the step-down transformer 29 is connected through the control switch across the power line. One end of the secondary winding is connected through the control switch to the power line ground. The other end of the secondary winding is connected through meter switch 26 to either ammeter 24 or milliammeter 25 thence through the control switch to jack 36, cable 37 and the known ground. Switch 26 is then thrown to the ammeter position and the reading on ammeter 24 is noted. The circuit components are selected so that a maximum reading on meter 24 would be approximately 40–50 amps, but this may be adjusted by variable resistance 40 to a value suitable for the equipment being tested. This test checks the current carrying capacity of the receptacle ground circuit. An extension cord may be tested in a similar manner by connecting it between plug 10 and the AC receptacle. Depending on the size and length of the extension cable, the reading may drop down to 25 amps with a cord 10 feet or longer in length. When switch 26 is thrown into milliammeter position the reading on milliammeter 25 is noted to indicate the continuity of the ground circuit. This may be performed both before and after its capacity has been checked. Again the components of the tester have been chosen so that a normal reading on milliammeter 25 for a continuity check would be approximately 10 milliamperes.

A power circuit containing an isolation transformer may be tested in a similar manner. That is, plug 10 of the tester is connected to the power circuit containing the isolation transformer. With the control switch turned to position No. 2, indicator lamp 23 will light-up showing correct wiring of the circuit. The control switch is then placed in position No. 3 and the respective readings on the ammeter 24 and milliammeter 25 are noted as with the prior test. The control switch is then placed in position No. 5. Push button switch 32 is then depressed. This checks the leakage current between one side of the power line and ground. In this position, current will flow from the power circuit to milliammeter 25 through the fuse 39. The return side of the power line is connected through resistor 28 to milliammeter 25, the ground side of the power line is connected by push button switch 32 to the milliammeter. The reading on milliammeter 25 is noted and, with the selected circuit values, should be a maximum value of approximately 10 milliamperes. If no reading is obtained on the milliammeter, then push button 31 is depressed to check the meter. Under this condition, the milliammeter 25 is connected between both sides of the power line through resistor 28. The maximum reading in this instance should be about 10 milliamperes. The control switch is then turned to position No. 6 and the same test is repeated as in position No. 5. In this case, the opposite side of the three-wire power line is tested. The readings on the ammeter and milliammeter should have the same respective values as obtained in the prior test.

If it is desired to make a safety test on a portable electrically operated tool, the tool's power plug is inserted into receptacle 35 in the tester. The tester is activated by means of power plug 10 being inserted into a receptacle connected to the power mains. The clip of test cord 37 is attached to the metal frame of the tool and the plug of the test cord is inserted into jack 36. The activating switch of the portable tool is then turned on. The control switch of the safety tester is turned to position No. 3. Meter switch 26 is turned to the ammeter position. The power cable of the portable tool is then pushed, pulled and twisted while the reading on the ammeter is noted. While the reading will be a function of the size and length of the cable, it should be ranged between about 23 to 50 amperes and should not vary at all as the cable of the tool is pulled and twisted. This test checks the current carrying capacity of the tool's ground circuit. A zero or intermittent or varying current indicates broken wires or faulty connections. When meter switch 26 is turned to the milliammeter position, the reading thereon is noted to check the continuity of the ground circuit. Again the reading should be approximately 10 milliamperes.

The insulation resistance to ground of the portable tool may be checked next. The control switch is placed on position No. 4. This switches the primary of high-voltage transformer 30 across the power line. One end of the secondary of transformer 30 is connected to the power line ground while the other end is connected through fuse 39 to one terminal of milliammeter 25. The other terminal of milliammeter 25 is connected to push button switch 31 and then through push button switches 33 and 34 to the respective power leads of the receptacle 35 to which the portable tool is connected. In making the test, push button switch 33 is depressed for about 10 seconds. This will impress approximately 500 volts between the insulation and ground. There should be no indication on the milliammeter when tools without interference-reducing capacitors are being tested. With tools having interference-reducing capacitors, a reading of approximately 50 milliamperes is permissible. If this value is exceeded, the capacitor in the tool should be disconnected and the tool rechecked.

As a final step in the testing procedure, the control switch may be turned to position No. 7. In this position, the tool is connected to the power line via push button switch 34. With the push button switch 34 depressed, the tool, if in proper electrical working condition, should operate normally.

Obviously many modifications and variations of the present invention are possible in the light of the above teachings. It is therefore to be understood that within the scope of the appended claims the invention may be practiced otherwise than as specifically described.

What is claimed is:

1. An electrical safety testing device for determining the safety of electrical power receptacles and tools comprising:

a switch comprising a plurality of ganged sections each having correspondingly numbered terminals;

a three-wire electrical cable capable of connection to an electrical power outlet;

an internal ground connection point;

a first of said cable wires being connected to a first terminal of a first section of said switch;

a second of said cable wires being connected to a first terminal of a second section of said switch;

a third of said cable wires being connected to said ground connection point and connectable to the neutral point of said electrical power outlet;

rotating contact-arms associated with each of said first and second sections for making electrical connection between the first terminal and any of the remaining terminals of each of said respective sections;

a lamp indicator connected through corresponding second terminals of said first and second switch sections to said first and second cable wires;

whereby the illumination of said lamp will indicate the presence of electric power at said power outlet;

a first transformer having a primary winding connected through corresponding third terminals of said first and second switch sections to said first and second cable wires;

the secondary winding of said first transformer being selectively connected at one side thereof through first switch means to one side of a first current meter and to one side of a second current meter;

the other side of said secondary winding being connected through a second switch means to said third cable wire;

the other sides of said first and second current meters being connectable to an electrical appliance which is to be tested;

said appliance also being connectable to an external grounding point;

whereby the current carrying capacity of said appliance will be indicated by said first current meter and the continuity of the ground circuit between said internal ground connection point and said power outlet neutral point will be indicated by said second current meter;

said second current meter being connected to a fourth terminal on said first section and fifth terminal on said second section;

one side of said second meter being connected through said first section to said first cable wire;

the other side of said second meter being connected through a third switch means by said second section to said second cable wire when said switch means is in a first position and by said third switch means through said third section to said ground connection point when said third switch means is in a second position;

said first and second cables being connectable through an isolation transformer which is to be tested to said power outlet;

whereby the leakage current of said isolation transformer is measured on said second meter when said third switch means connects said second meter to said ground connection point and the continuity of said isolation transformer is determined when said third switch means connects said second meter to said second cable wire;

a second transformer for stepping-up voltage having a primary winding connected through corresponding sixth terminals of said first and second switch sections to said first and second cable wires;

the secondary winding of said second transformer being connected at one side thereof to one side of said second current meter;

the other side of said secondary winding being connected through a fourth switch means and said second switch means to said ground connection point;

said internal ground connection point being connectable to an electrical tool having first and second electrical power wires and a third power wire for connection to a power outlet neutral point;

said tool first and second power wires being selectively connected to the other side of said current meter and said tool third power wire being connected to said internal ground connection point;

whereby the insulation resistance of said tool is indicated by said second meter as stepped-up voltage is applied between each of the electrical power wires of said tool and the neutral third power wire thereof.

References Cited

UNITED STATES PATENTS

| 2,806,993 | 9/1957 | Matousek | 324—51 |
| 3,141,128 | 7/1964 | Behr | 324—51 |
| 3,176,219 | 3/1965 | Behr | 324—51 |
| 3,181,060 | 4/1965 | Hull | 324—51 |
| 3,205,436 | 9/1965 | Donahue | 324—51 |

FOREIGN PATENTS 807,544   1/1959   Great Britain.

RUDOLPH V. ROLINEC, *Primary Examiner.*

G. R. STRECKER, *Assistant Examiner.*